B. Hancock.
Excavator.
Nº 13,680. Patented Oct. 16, 1855.

UNITED STATES PATENT OFFICE.

BENJ. HANCOCK, OF TROY, NEW YORK.

EXCAVATOR.

Specification of Letters Patent No. 13,680, dated October 16, 1855.

*To all whom it may concern:*

Be it known that I, BENJAMIN HANCOCK, of the city of Troy, in the county of Rensselaer and State of New York, have invented certain new and useful Improvements in Machines for Excavating Earth, &c.; and I hereby declare that the following is a full, clear, and exact description thereof, reference being had to the accompanying drawings, making a part of this specification, in which—

Figure 1:
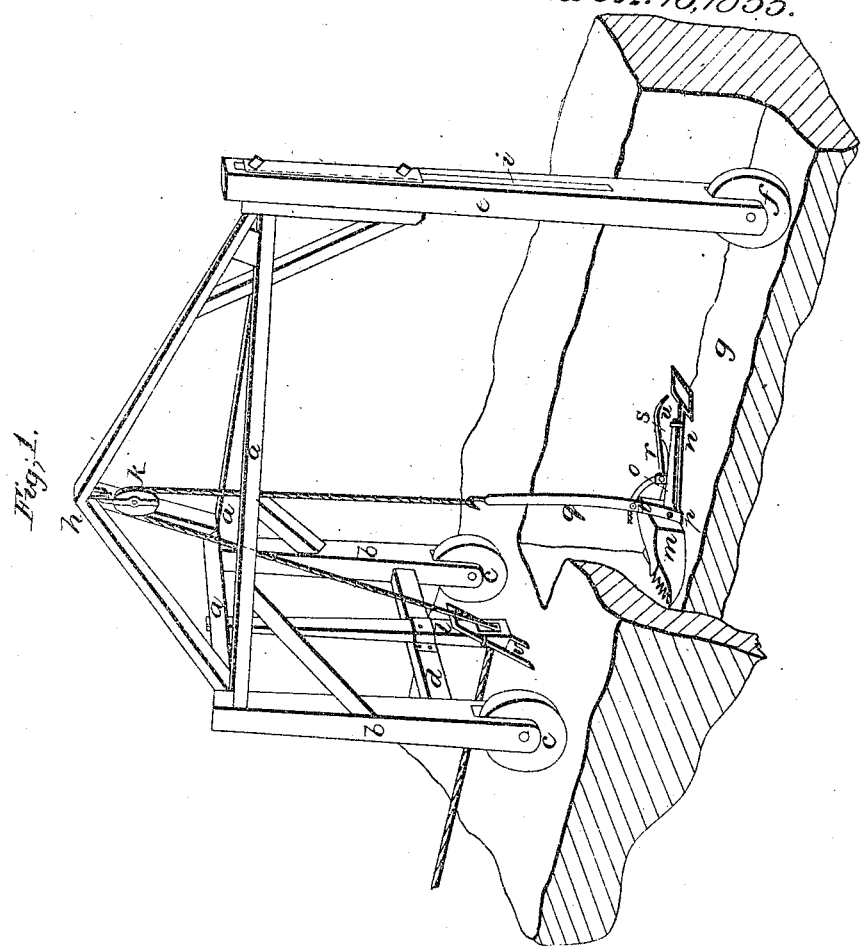
Figure 2:
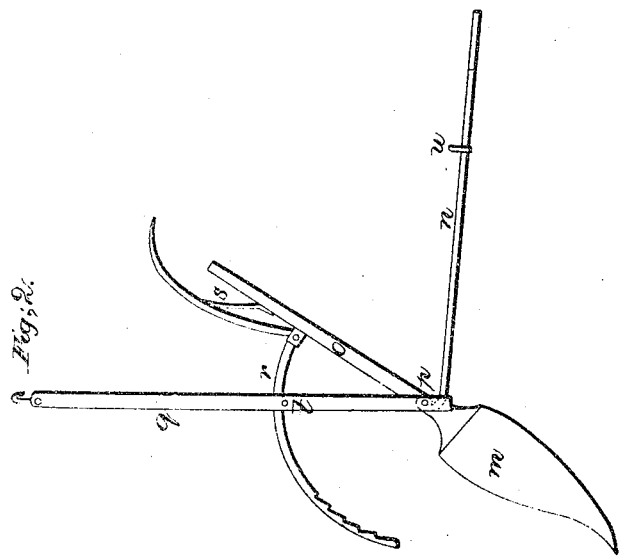

Figure 1 represents a perspective view of the machine and Fig. 2 an enlarged view of the dumping scoop.

The letters of reference indicate the same parts in the different figures wherever they occur.

The nature of my invention consists in the construction and arrangement of parts of the dumping scoop as herein described and secondly in the combination of the scoop with the adjustable frame as herein described for the purpose of facilitating the application of horse or other power thereto.

I construct a framework of three pieces (*a*) arranged horizontally in the form of an isosceles triangle. The two forward angles are supported by uprights, (*b*) resting upon wheels (*c*). These uprights are connected by a cross piece (*d*). The apex of the triangle (which is at the rear of the machine) is supported by an upright (*e*) longer than the others, and also furnished with a wheel (*f*) resting upon the bottom of the excavation *g*, it is made adjustable in its length by means of bolts, which are made to slide in the slot *i*, when the nuts are loosened. From each of the angles of the triangle extend inclined pieces, mutually supporting each other, and meeting at the point *h*, where the block *k* is suspended. An upright piece (*l*) with a sheave in its lower extremity passes through a staple in the forward part of the machine, where it is secured by a pin. It can be raised in the staple when required. The framework is stiffened by suitable braces.

The excavating scoop Fig. 2 is composed of the scoop proper *m*, with its shaft *o*, pivoted at *p* to the slotted suspension rod *q*. A lever (*r*) is pivoted to the shaft *o*, and bent at its forward end into a segment of a circle the center of which is at *p*, the rear end being held up by a spring (*s*) and the segment being furnished with notches which engage on the pin *t*. The handle *n*, is also pivoted at *p*, and carries a sliding ring *u*, to hold the shaft *o*, down to the handle *n* when in use. To the top of the rod *q*, a rope is secured which passing through the block *k* and down through the sheave in *t*, is attached to the horse or other power employed. Double blocks, and tackle can be substituted for the single block.

The machine is shown in Fig. 1 as arranged for digging a trench or ditch of moderate depth. It is secured in position against the force of the working power, by inclined irons (*v*) which are forced into the ground through staples in the upright *l*, or in any other convenient manner. A laborer having adjusted the pitch of the scoop by placing the proper notch of the segment upon the pin *t*, forces the scoop against the earth to be removed, by means of the handle *n*. The horse is put in motion and by means of the rope raises the scoop filled with earth to the desired elevation. Then if the excavation is not too deep he (retaining his hold upon the handle *n*) slips back the ring which holds the shaft *o*, to the handle, bears the scoop over to the place where its load is to be discharged, and presses on the handle of the lever *r*, thus elevating the segment, and releasing it from the pin, he lets go his hold upon the lever. The load is then dumped by the sudden tipping of the scoop *m*. When it becomes necessary to move the machine forward the irons *v* are raised and the team exerts its power for that purpose. When it is to be removed from place to place the upright *e*, is slid up until its wheel *f* is brought on a level with the others, and there secured.

My machine is best adapted for narrow excavations of varying depth, such as ditches, and trenches for pipes, sewers, &c., and admits of a great saving in manual labor, by the substitution therefor, of the power of horses, portable steam engines, &c., in a convenient manner.

Having thus fully described my improved machine, what I claim as my invention and desire to secure by Letters Patent is—

1. The dumping scoop constructed, arranged, and operated substantially as described, and for the purpose specified.

2. In combination with the above, the movable, and adjustable frame as herein described for the purposes set forth.

BENJAMIN HANCOCK.

Witnesses:
JOHN S. HOLLINSHEAD,
CHAS. EVERETT.